Aug. 22, 1933.  J. P. BEM  1,923,474
FRUIT PITTING MACHINE
Filed Nov. 5, 1929   9 Sheets-Sheet 5

INVENTOR.
JOSEPH P. BEM
BY Miller, Boyken & Bried
ATTORNEYS.

Aug. 22, 1933.  J. P. BEM  1,923,474
FRUIT PITTING MACHINE
Filed Nov. 5, 1929   9 Sheets-Sheet 9

INVENTOR.
JOSEPH P. BEM
BY Miller Boykin & Bried
ATTORNEYS.

Patented Aug. 22, 1933

1,923,474

UNITED STATES PATENT OFFICE 1,923,474

FRUIT PITTING MACHINE

Joseph P. Bem, Fresno, Calif., assignor to Pacific Pitting Machine Company, Inc., Fresno, Calif., a Corporation of California Application November 5, 1929. Serial No. 404,900

57 Claims. (Cl. 146—28)

This invention relates to machines for automatically bisecting and pitting or coring fruit, particularly clingstone peaches, and is of the general type shown in my copending application for patent on Pitting machine filed under Serial No. 337,343.

The objects of the present invention are to provide general improvements in the type of machine mentioned, together with greater speed and also a rearrangement of the parts whereby a better control of the pitting operation may be exercised by the operative who has a clear view of the knives cutting out the pits at all times.

In the drawings accompanying this application:

In Figs. 1 and 2 several sheet metal and wire guards which normally enclose some working parts of the machine to guard the operative have been omitted so that the elements will not be obscured from view.

Fig. 18 is a detached plan view of the carriage and mounting members of the bloom end device.

Fig. 19 is a side elevation of Fig. 18 showing the cam actuated lever and appurtenances controlling the reciprocating movement of the carriage and lateral swinging of the bloom end device.

In order to give an easy grasp of the necessarily complicated description of the machine it is thought best to precede it with a general description explaining the main features and mode of operation differing from the machine of my copending application aforesaid.

In the present machine the peaches are first centered from the bloom and stem ends between bloom and stem end receiving devices and the next movement of the machine impales the centered peach upon a pair of horizontally extending vertically disposed aligning guide plates spaced edgewise one above the other so as to straddle the pit of the fruit as well as straddle the bloom and stem end centering devices substantially as in the machine of my copending application, but after this the fruit is handled in a different manner. After impalement of the fruit on the plates through operation of the machine the bloom end device moves out of the way and the fruit is slid along the impaling guides by the movement of the stem end device and onto a set of receiving plates carried on vertically revolving four-sided cooperating turrets, and the fruit and pit are bisected by a saw positioned between the receiving plates of the turrets while clamped from opposite sides thereagainst by spring actuated fingers. After bisecting the fruit by the saw, the turrets revolve a quarter turn to bring the sawed halves of the peach respectively to opposite sides at the front of the machine facing the operator and just behind the arched pitting knives carried on upright shafts in front of the machine spaced at opposite sides of the center or in line with the axes around which the turrets revolve. When the turrets arrive at this position the next sides of the turrets which are to follow arrive in receiving position to receive the next peach from the impaling guides as aforesaid, and the two forwardly facing half peaches in the forwardly facing sides of the turrets are simultaneously pitted by the arched pitting knives.

The knives vibrate or oscillate along the arcuate surfaces and are resiliently free to yield to any form or size pits presented, in a manner substantially like the knives and of my copending application except as to the details of mounting and the position of the knives, which as stated is to either side of the operator cutting the pits out of two half peaches in plain sight during every part of the operation.

The knives are swung through the fruit by spring pressure only and the turrets are locked in place until both knives have finished their cuts and at the completion of which the turrets are unlocked and revolved to bring new faces to the respective positions of operating on the fruit, the two freshly sawed halves forward to the pitting knives and the pitted halves to succeeding positions where the clamping fingers release the halves and they are ejected from the machine.

While the two halves are being pitted on the forward sides of the turrets the sides to follow have received a fresh peach from the impaling guides as explained and the saw has bisected the same, the turrets remain locked against revolution until both the sawing operation as well as the pitting operations have been completed.

During the revolving of the four-sided turrets their sides are contracted or collapsed umbrella-like so that when they straighten up at at each working position they will be closely positioned against the various instrumentalities for performing the succeeding operations, the adjacent sides of the two turrets at the peach receiving position coming together upon the bisecting saw with just sufficient clearance for the thin blade of the saw to operate in.

The saw used is a vertically reciprocating or jig saw with a thin hack-saw-like blade and the frame of the saw is moved to carry the saw along between the opposed receiving plates of the confronting sides of the turrets to completely sever the two halves of the peach and after which it is drawn back out of the way of the next peach to be slid onto the receiving plates of the next coming sides of the turrets.

While the turrets revolve with an intermittent motion and are clamped immovable during the various operations, the reciprocatory motion of the jig saw and the vibration of the pitting knife blades is continuous whether cutting or not.

Figure 15:
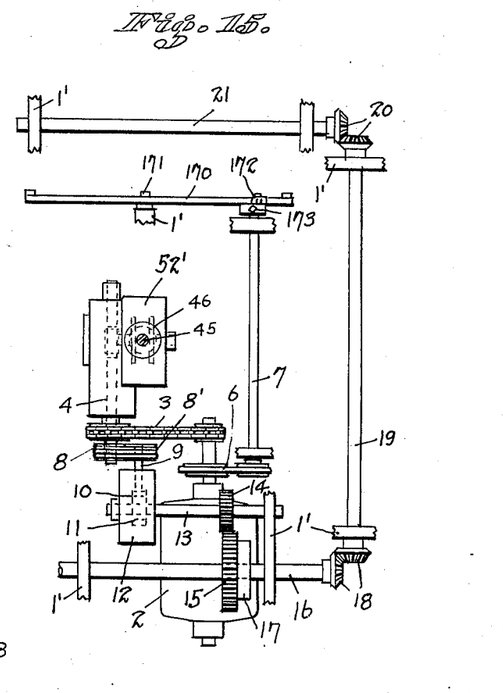
Fig. 15 is a diagrammatic layout of the drive or power transmitting arrangement from the motor to the two cam shafts, showing the main control clutch of the machine on the rear cam shaft, and the continuous drives for oscillating the arched pitting blades and for reciprocating the jig saw.

The machine for carrying out the above consists of a main frame 1 and its various vertical, horizontal and cross members generally termed 1' which support all of the machine elements driven by a motor 2 (see Fig. 15) belted at 3 preferably by means of a silent chain drive to a pulley or sprocket secured to a shaft 4 which continuously reciprocates the jig saw shaft 45, while another belt 6 from the motor continuously operates the pitting blade shaft 7. A belt 8 from another pulley on the saw operating shaft operates a pulley 8' on shaft 9 operating a set of worm reduction gears 10—11 in a box 12 for giving a reduced speed to countershaft 13 in turn geared at 14 to a clutch gear 15 loose on rear cam shaft 16 and forming one member of a main clutch 17 by which the operations of the machine are controlled.

Rear cam shaft 16 extends across the machine and is geared at one end at 18 to a horizontally extending shaft 19 in turn geared at its forward end at 20 to a front cam shaft 21 extending across the machine.

All the shafts mentioned are supported in suitable bearings indicated in the several figures of the drawings.

The clutch 17 for engaging shaft 16 is of the positive type of well known construction and is tripped by a rod 22 operated from the front of the machine by a touch of the finger on a button 23, means being provided whereby this tripping of the clutch does not become effective until both the sawing of a peach in the machine and the pitting of the two previously sawed halves have been completed and upon which the consummation of the clutch tripping operation is automatically completed. The mechanism for accomplishing this will be described in detail later.

An electric circuit switch 24 is also provided for throwing the motor in and out of operation when desired.

The peach A (with particular reference to Fig. 3) is first placed between the bloom and stem end receiving and aligning devices 25, 26 with the suture of the peach aligned with an aligning finger 27 extending forwardly from a carrier 28 horizontally slidable on rods 29—30 and which carrier carries the spaced guide plates 31, 32 upon which the peach is impaled upon the forward movement of the carrier when the machine is set in motion. These guide plates are vertically aligned as shown in Fig. 3, are divergingly beveled and sharpened at their forward edges 33, and in movement of the carrier advance to the dotted position 31', 32' shown in the figure so as to impale the peach A in the manner indicated.

The bloom end receiving device 25 carries a spoon-shaped revolvable tip cutter 34 adapted upon a fractional revolution to cut off the tip of the peach and both bloom and stem end devices are on separate carriages 35, 36 horizontally slidable on separate guides 37, 38.

After the peach is impaled the carrier 28, also the bloom and stem end devices 25, 26, move away from the operator carrying the peach along until the plates 31, 32 substantially abut the confronting plates 39, 40 of the confronting sides of the cooperating turrets generally designated F, F, and which plates together with the crack left between the turrets for the saw blade 41 substantially equal the thickness of the peach guiding plates 31, 32 of carrier 28 so that the peach A is easily transferred thereto to the position B by continued horizontal motion of the stem end device 26 to the dotted position 26'.

Figure 3:
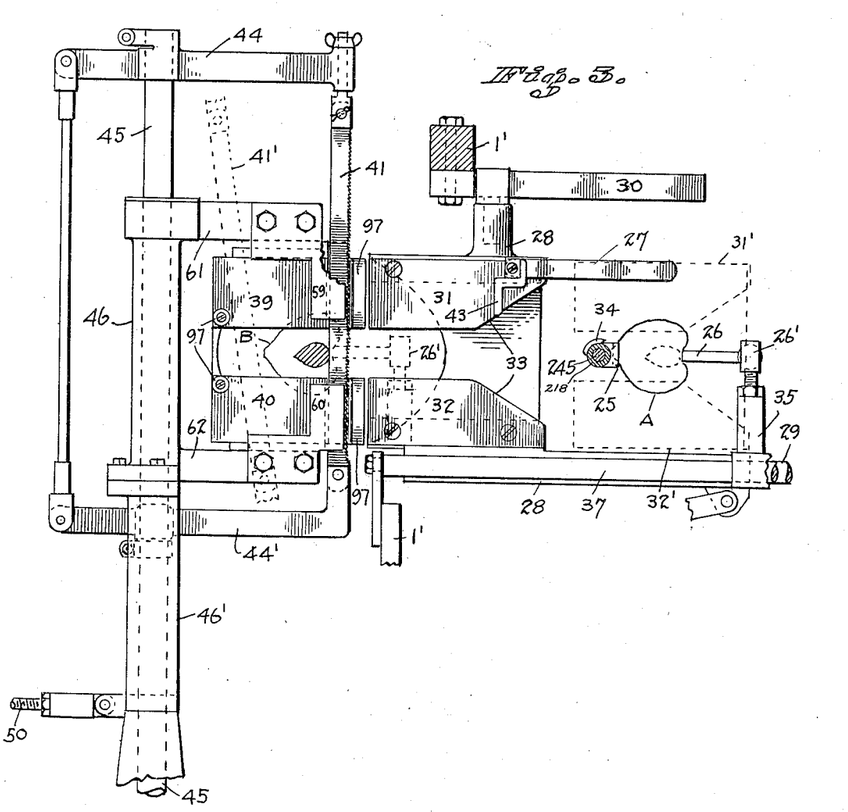
Fig. 3 is an enlarged elevation of a central section of the machine showing the peach receiving devices, aligning guide plates, bisecting saw and face or receiving plates of one of the turrets.

During this transfer of the impaled peach from guide plates 31, 32 to the turret plates the saw 41 is in retracted position 41', the tip cutter is operated by its lever 42 striking a pivoted stop 43 on the carrier 28 and the bloom end device is bodily swung horizontally out of the way of the saw, the stem end device retracts to position 26 and the saw advances through the peach on the turrets to the full line position shown in Fig. 3.

The saw, as stated, is continuously reciprocated by the drive described and it is advanced between the plates or faces of the turrets by bodily moving of its frame 44 and reciprocating shaft 45 on a swinging saw supporting frame or column 46 pivotally mounted in bearings 47 (see Figs. 13 and 14) at its lower end so that the entire assembly may be rocked forward to vertical position 41 or backward to position 41' of the saw blade. The rocking of the saw column is carried out in proper timed relation with the movements of the machine by means of a suitably shaped cam 48 on rear cam shaft 16 operating against a rocker arm 49 in turn connected by a link or rod 50 so as to pull the saw back when the peach is being received and permit the saw to pass through the peach under tension of a forwardly urging spring 51 connected with the rocker arm or the rod and to a member 1' of the main machine frame.

Figure 13:
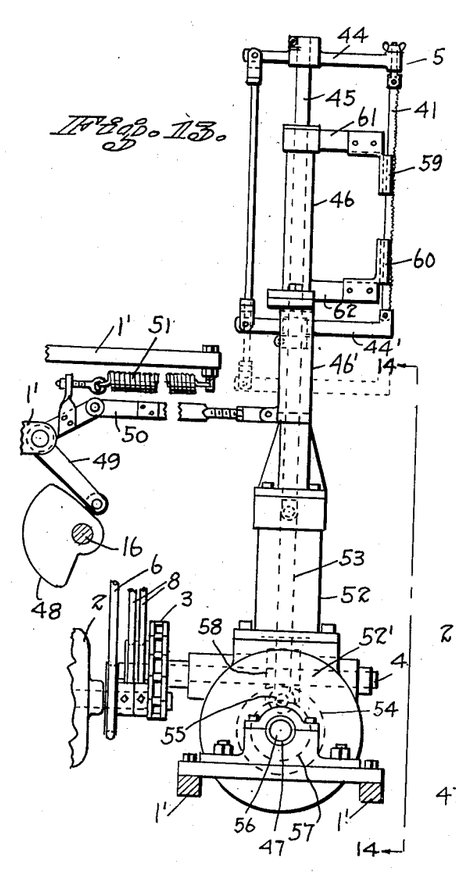
Fig. 13 is a detached view of the jig saw assembly.
Figure 14:
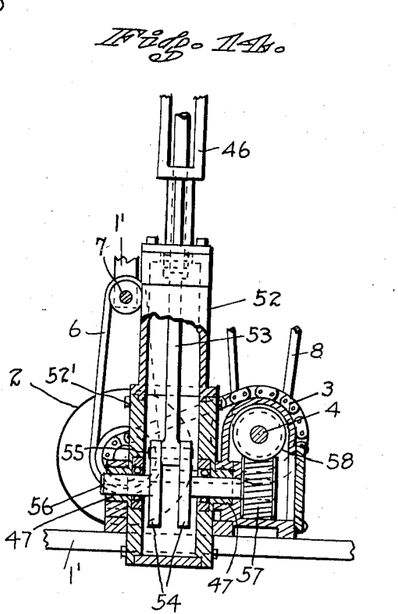
Fig. 14 is a side view of Fig. 13 as seen from the line 14—14 thereof with parts broken away.

The upper portion 46' of the saw column slidably supports the saw shaft 45 for reciprocation and the central portion is bifurcated for guidance and passage of the lower saw frame arm 44' which reciprocates from the dotted position shown in Fig. 13, while the extreme lower end of the column assembly is enlarged into the form of a cylinder 52, containing a connecting rod 53 and a housing 52' containing a pair of crank disks 54 provided with a crank pin 55 to which the connecting rod connects.

Crank disks 54 are carried on a shaft 56 provided with a gear 57 meshing with a gear 58 carried on saw drive shaft 4.

It should be noted that on account of the slight set of the saw teeth the saw is guarded from sawing the confronting faces of receiving plates 39, 40 of the turrets by means of very thin spacing strips 59, 60 lying against opposite sides of the blade just back of the teeth and carried by a pair of bracket arms 61, 62 extending from the saw column 46 just above and below the turrets.

The cooperating turrets F, F, which receive the peach for bisecting and carry it successively through the pitting, releasing and discharge stages, are best shown in Figs. 4 to 11. These turrets are revolvably carried on spaced vertical shafts 63 geared together at their lower ends at 64 to a horizontal shaft 65 operated by a ratchet disk 66 fixed to shaft 65 and intermittently revolved a quarter turn by a ratchet 67 carried on an arm 68 free on shaft 65 and which arm is moved the required distance at the proper time by a crank arm 69 secured to rear cam shaft 16 operating against a cam 70 carried by a lever 71 pivoted at its rear end at 72 to the frame 1 and linked at its forward end at 73 to ratchet arm 68.

The turrets are positively locked in the four positions by means of a disk 74 secured to the upper end of one of shafts 63 (see Figs. 2 and 6) and which disk carries four projecting lugs 75 alternately engaged by a recess 76 in a movable latch block 77 carried on a vertical extension 78 pivoted at 79 to a fixed member or part of the frame 1'. The extension 78 is provided with a spring (not seen) which normally forces the latch 77 toward the turret locking disk to snap into engagement with the bolts 75 of the turret as they come around. The lock is released at proper timed interval by means of a cam 80 secured to the inside of lever 69 on the rear cam shaft and which cam 80 strikes a rocking lever 81 pivotally connected to a link 82 in turn connected through bell crank 83 to rod 84 which is pivotally connected at its forward end at 85 to a small crank 86 secured to a small shaft 87 revolvably supported in frame member 1' and provided with a small cut-out cam notch (not shown) which overlies latch extension 78 and forces the latch out of engagement with the turret disk lugs just before each fractional turn of the turrets through the operation of ratchet disk 66 as previously described.

Figures 4, 5:
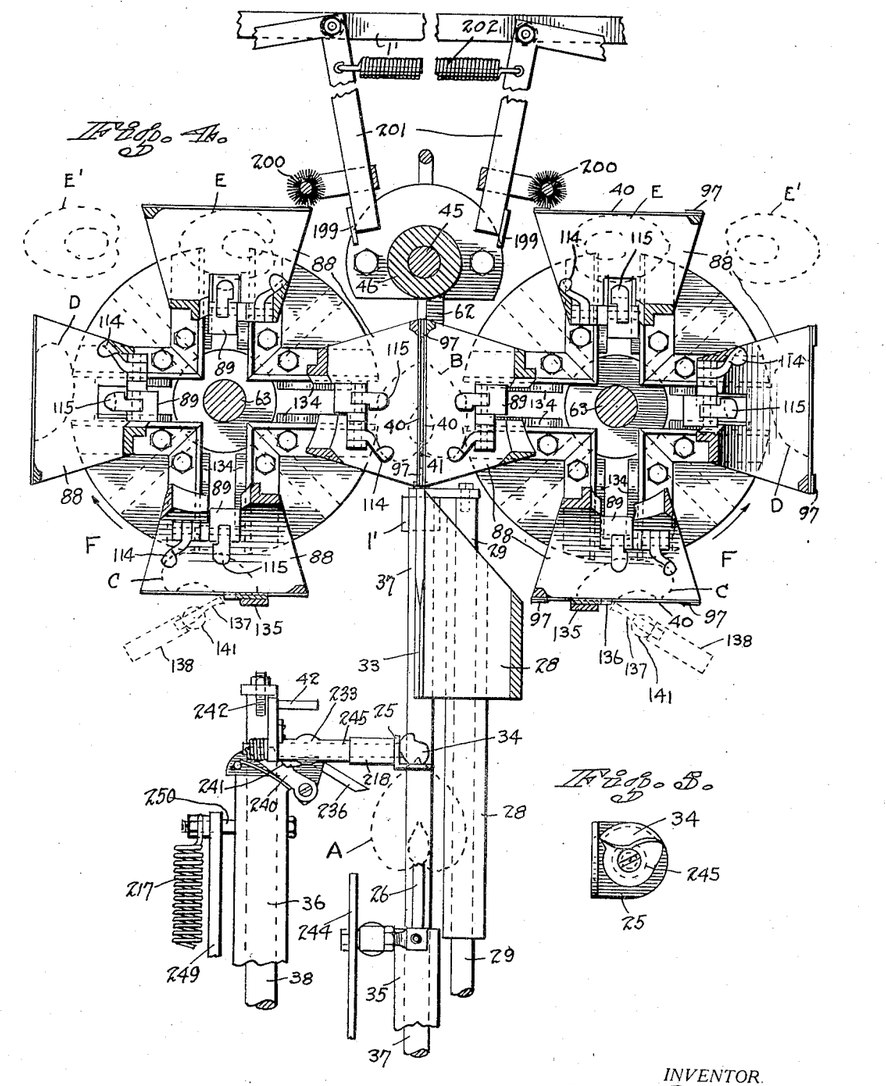
Fig. 4 is an enlarged central cross section of the turrets showing their cooperation with a face of each in contact. The figure also shows the relation in plan of the bloom and stem end peach receiving devices and the peach aligning and impaling guide plates to the receiving face plates of the turrets. The figure also shows the tip cutter on the bloom end device.
Fig. 5 is an enlarged side view of the tip cutter on the bloom end device shown in plan in Fig. 4.
Figure 6:
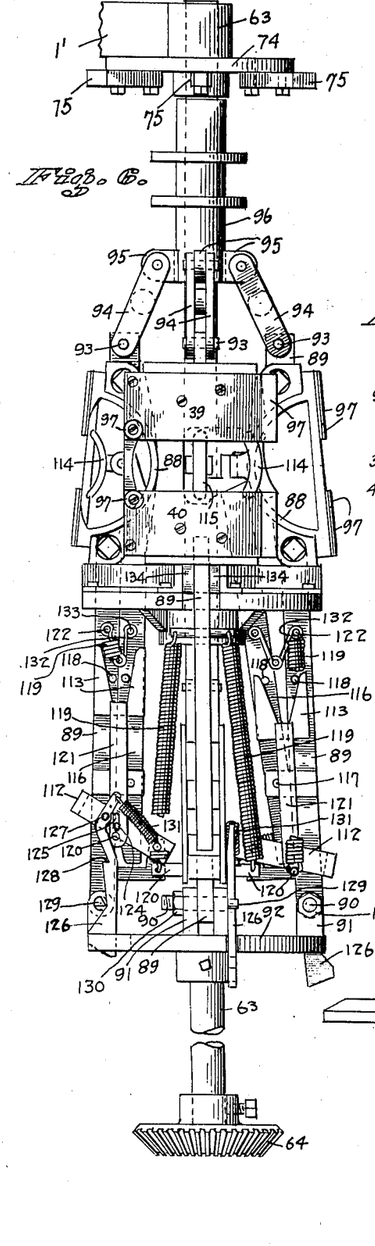
Fig. 6 is a detached view of one of the turret assemblies as seen in elevation showing the collapsing or umbrella action and the peach clamping fingers and locking mechanism.
Figure 7:
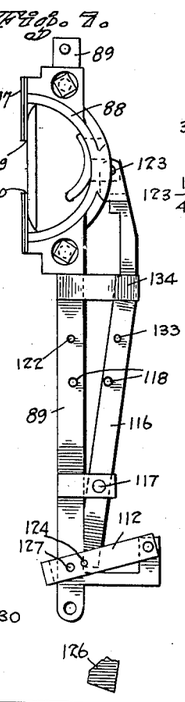
Figs. 7, 8, 9, 10 and 11 are detached details of the turret assembly of Fig. 6.
Figure 8:
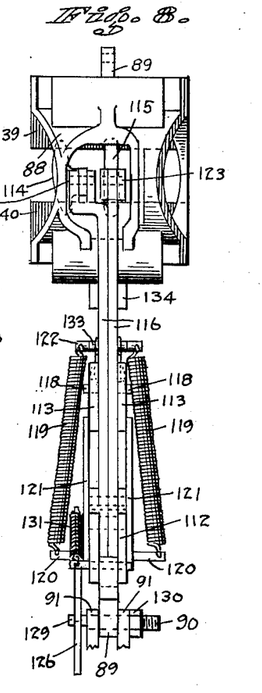
Figures 9, 10:
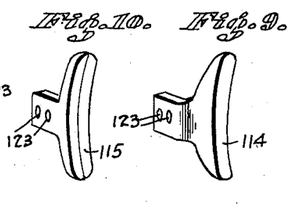
Figure 11:
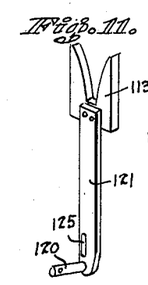
Figure 11B:
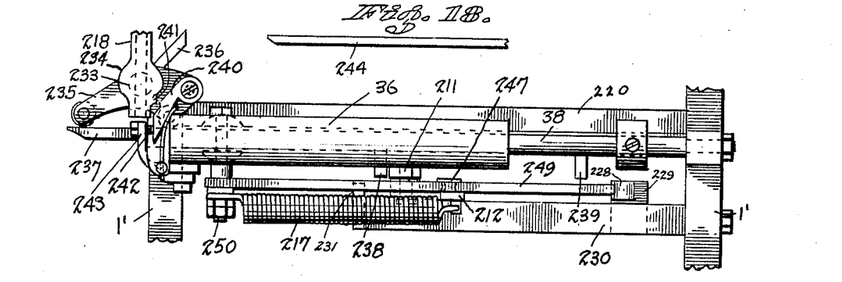
Figure 11D:
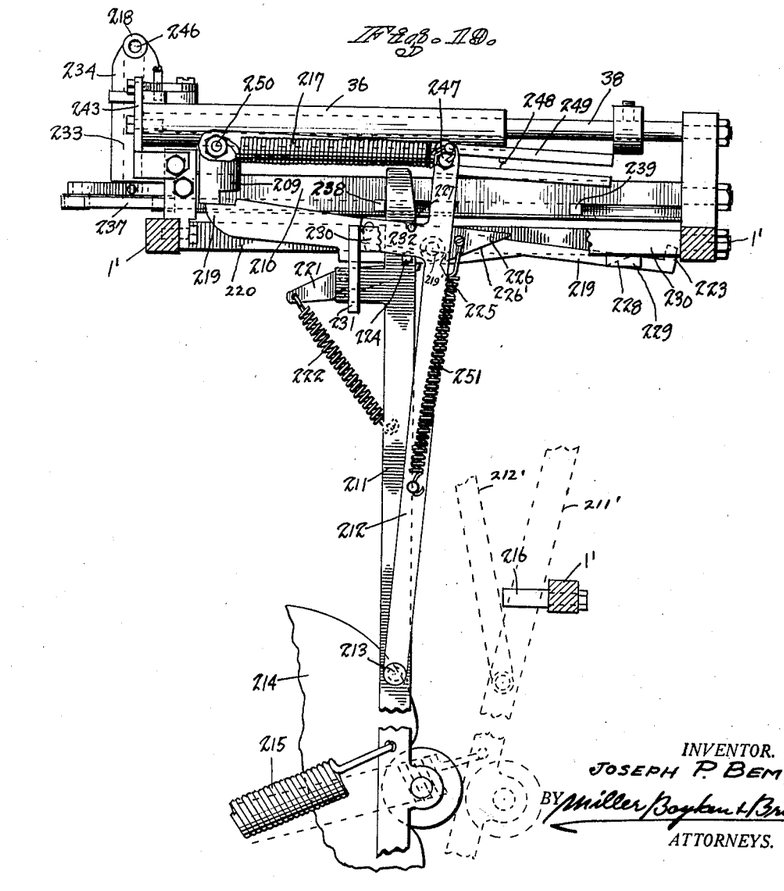

Returning to the construction of the turrets proper, each is four-sided with each side comprising two thin metal plates 39, 40 spaced one above the other as shown and supported on rearwardly arched backing frames 88 so as to preserve a free open passageway between the forward ends of the plates for passage of the pit of the peach as same is slid in place from the aligning guide plates 31, 32. The arched backing frames 88 are carried on vertical bars 89 pivoted at their lower ends at 90 to upwardly projecting lugs 91 of a disk 92 secured to turret shaft 63, while the upper ends of bars 89 are pivotally connected at 93 to links 94 in turn pivoted to lugs 95 on a sliding collar 96 on shaft 63 so that upon sliding the collar upward the bars 89 will be drawn inward at the top like an inverted umbrella to thereby collapse the sides of the turrets inwardly (all as shown in Fig. 6) so that the turrets may then be turned to the next position without interfering with one another or with the pitting knives or other instrumentalities at the different positions, and when the collars are pushed downward on the shafts 63 they will force the links 94 and bars 89 outward to bring the plates 39, 40 to vertical position, the two central faces of the turrets coming together on opposite sides of the saw as shown in Fig. 4 and held to just clear the saw blade 41 and its side guides 59, 60 by means of small spacers 97 secured to the face of the plates on the right-hand turret.

The turrets are collapsed and straightened out at the proper time by means of two suitable cams (one of which is shown at 98) on the rear cam shaft one of the cams serving to push the collar 96 up and the other to push it down so that the umbrella action of the turrets will be positively carried out. The action of the umbrella operating cams is to raise and lower vertical rods 99, 100 respectively and which rods pivotally connect to horizontal rods 101, 102 both of which are secured to a transversely extending rock shaft 103 provided with two forwardly extending arms or rods 104, 105 carrying at their outer ends roller engaging one of the sliding umbrella collars 96, the roller of the left-hand turret only being shown at 106.

Figure 2:
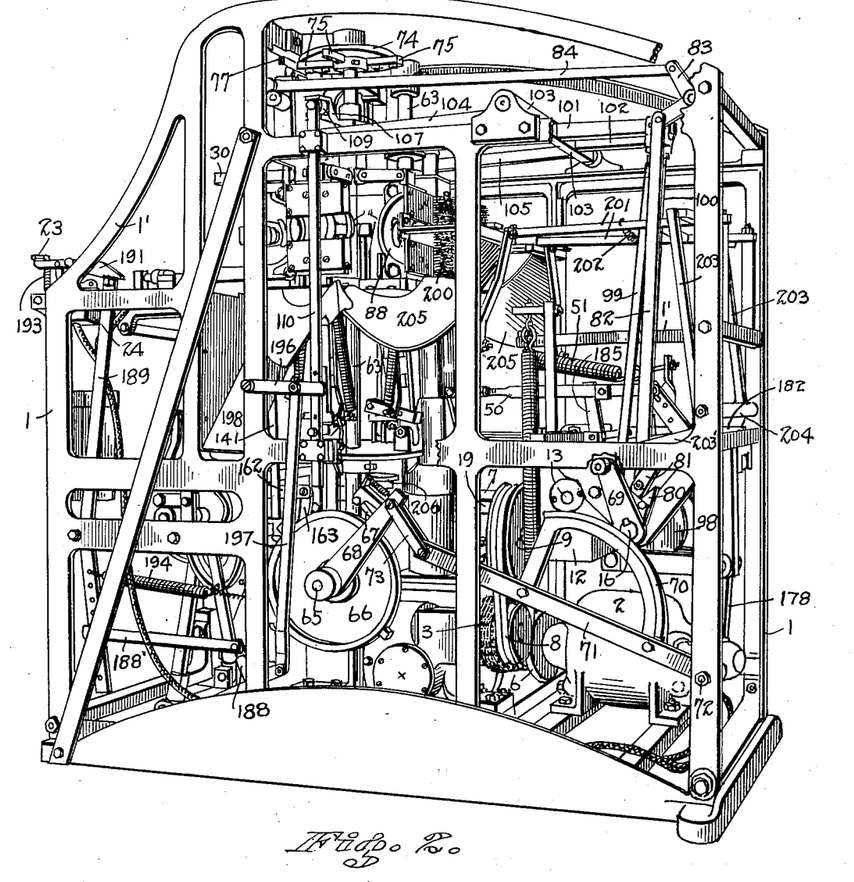
Fig. 2 is a perspective view of the right-hand side of the machine looking forward at an angle, and with portions of the frame broken away.

Also attached to the outer ends of arms 104, 105 are brackets 107, 108 each carrying a roller 109 for raising and lowering rods 110, 111 which are formed at their lower ends as indicated clearly in Fig. 2 for rod 110 to strike pivoted yokes 112 carried by the turrets to thereby pull down the wedges 113 to release the spring clamping fingers 114, 115 which clamp the fruit against the inner surfaces of turret plates 39 and 40.

Two of these fingers 114, 115 are provided for each side or half of the peach and they are mounted for independent action so that either is free to seat itself tightly against the curved outside of the peach after same is slid onto the turret plates, and when independently seated each finger is locked in the seated position. The construction includes a vertical rod 116 for each finger, each pair of rods being pivoted near their lower ends at 117 to opposite sides of bar 89 and both bar 89 and rods 116 being provided with pins 118 straddled by wedges 113 so that upon upward movement of the wedges the fingers will be forced against the fruit.

The wedges are individually and independently forced upward by springs 119 secured to their lower ends each to a pin 120 carried by the wedge extension 121 projecting from the sides thereof and at the upper end to pin 122 projecting from the sides of bar 89. The angle of the wedges being narrow the fingers are thus locked firmly against the sides of the fruit in whatever position they may assume, and the fingers are secured at 123 to the upper ends of rods 116.

At the position of the turret face following the pitting stage the fingers are released from the pitted halves by means of the vertical sliding rods 110, 111 operated by the umbrella actuating arms 104, 105 mentioned, and which engage the yokes 112 on the outer sides of the turrets only and which in turn through pins 124 projecting through slots 125 in wedge extensions 121 and forcibly pull the wedges down to release the fingers holding the pitted halves of the fruit at position D thereof. The yokes are locked in depressed position by means of swinging latches 126 pivoted at 127 to the sides of the yokes and which latches have a step 128 engaging a catch 129 conveniently formed on pivots 90. Pivots 90 are held against rotation in bars 89 by nuts 130. Latches 126 are urged to engage steps 128 by means of small springs 131, and the finger supporting rods 116 are urged outwardly when released, by means of small expansion springs 132 conveniently hooked over pins 122 on bar 89 and pins 133 on finger rods 116. Finger supporting rods 116 are guided for direct travel toward and from the fruit by spaced guide plates 134 projecting from the umbrella bars 89.

Figure 12:
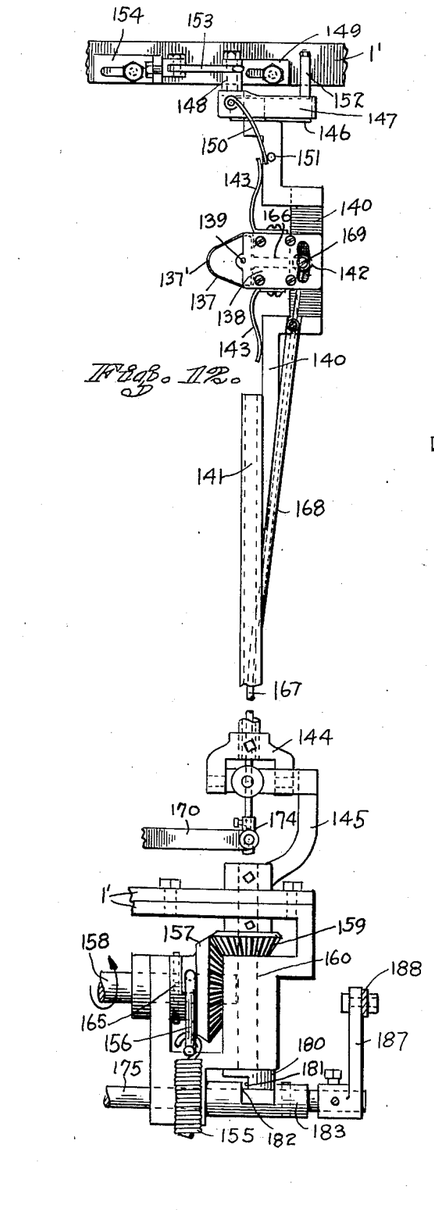
Fig. 12 is a detached view of one of the pitting knife assemblies as seen in elevation.
Figure 12A:
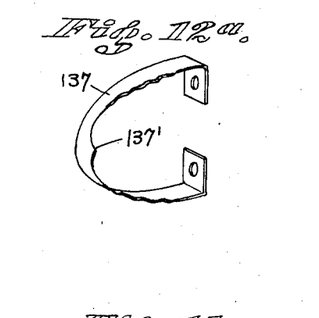
Fig. 12A is an enlarged perspective view of the arched pitting blade of Fig. 12.

At the forward sides of each turret where the halves of the fruit are pitted is provided a downwardly extending support 135 from the machine frame which carries at its lower end a curved segment 136 which lies between the turret plates 39, 40 and bears against the cut face of the bloom end of the peach so as to sustain it at this point as the curved knife comes out of the fruit after passing around the half pit, and I overcome any tendency to tear the fruit at this point by providing the blade with a forwardly projecting central point 137' as shown in Fig. 12A.

The arched pitting knives 137 are preferably formed with teeth and each knife is pivotally mounted on a carriage block 138 pivoted at 139 in the manner of my copending patent application aforesaid and the block carried on an offset portion 140 of a vertical shaft 141, the carriage in the present construction instead of being adjustable in various directions on the offset shaft is merely pivoted at 142 being resiliently held in central position by light flat springs 143 secured to the carriage and bearing at their free ends against the shaft, and to secure the bodily movement of the blade to rise and fall over the arch of the pit the entire vertical shaft 141 swings on a universal joint 144 supporting its lower end and secured to a crank arm 145 revolvably mounted in frame structure 1' so that the shaft may be rotated about a half turn to carry the blade through the fruit and reversedly back to starting point. The upper end of the shaft is secured in a block 146 carried in a bracket guide 147 vertically pivoted at 148 to a bearing 149 horizontally adjustable along the frame member 1' for initially setting the blade in best position with reference to the crown of the pit.

This bracket guide 147 carries a spring 150 bearing against a pin 151 in the upper part of the offset shaft so as to resiliently force same outwardly for the minimum depth of cut. A pin 152 projecting upwardly from the sliding block 146 to which the upper end of the shaft is secured controls the starting depth of the cut or point of entry of the blade into the fruit, and may be used to control the shape of the cut through the fruit for the entire length of the core removed if desired.

This control of the cut is achieved by means of a small curved guide or cam arm 153 projecting from a bracket 154 adjustably secured to the frame 1' of the machine and with the cam device 153 itself adjustably mounted in the bracket so that it may be bodily shifted to various positions as well as swung in and out relative to the arcuate travel of pin 152 to control the path of travel as may be desired.

For pitting peaches or other drupaceous fruits the curved cam arm 153 is relatively short so as to hold the pin in position to merely guide the pin (and knife) at the initial portion of the cut so as to start the cut at a point in the fruit just outside of the point thereon as originally located by the end of the stem end receiving device 26, and the arm is of a curve to force abrupt entry of the knife into the flesh of the fruit upon the swinging of the knife, then falls away to permit perfect freedom of the arched knife to follow the curve of the pit to the finish of the cut, the knife when free of the cam influence being resiliently held against the pit by spring 150 forcing the upper end of the pitting shaft outward, while any up and down displacement of the pit is compensated for by rocking of the carriage on pivot 142 under control of springs 143.

When coring fruit such as pears having no central pit, the cam arms 153 are made long enough and of a shape to control the entire length of cut.

Figure 1:
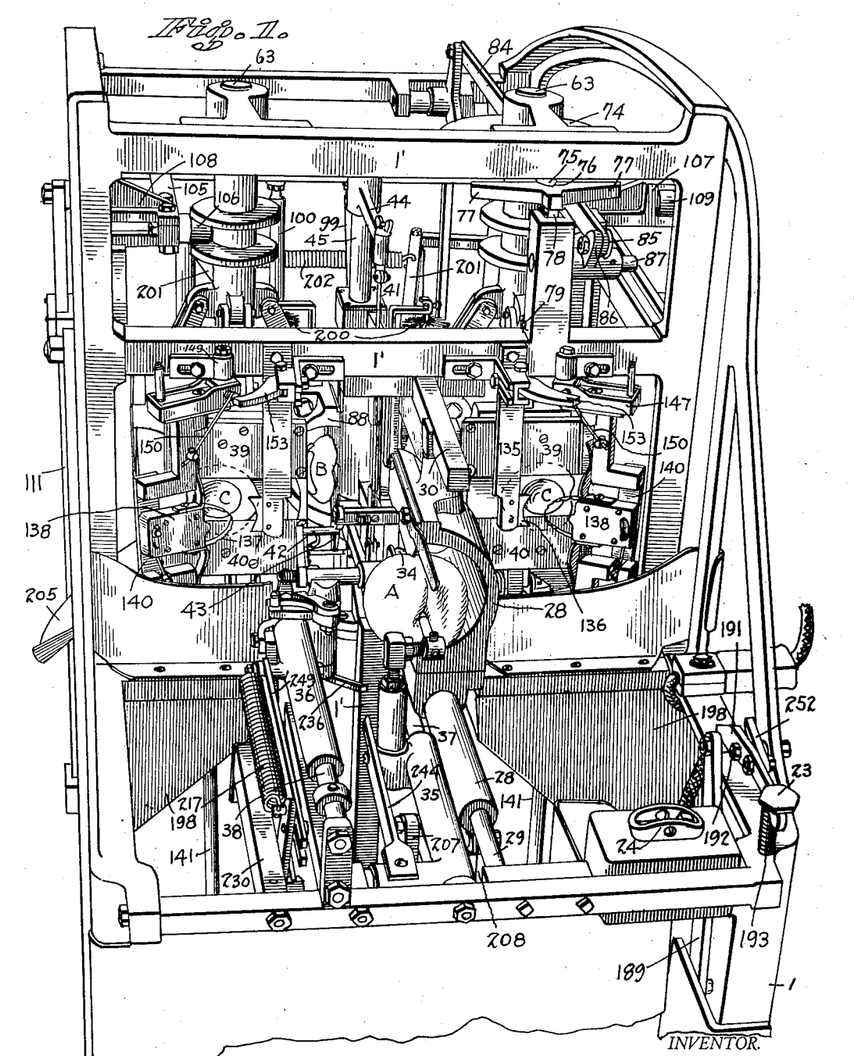
Fig. 1 is a perspective view looking down into the machine from the front end showing a peach placed in the bloom and stem end devices, another bisected on the confronting turret faces, and two halves on the turret sides facing the operator which have been pitted by the arched pitting knives. The lower portion of the machine with the actuating cams and levers is shown broken away.

In cutting out the pits or cores the knives swing toward one another to the finished position shown in Fig. 1 and where the turrets carrying the pitted halves C are collapsed away from the knives ready to start revolution as soon as turret locks 75 are released.

The knife shafts are given about a half turn for the cutting stroke by springs 155 anchored at their lower ends to the frame 1 and connected at their upper ends each to an arm 156 projecting from a gear 157 loose on a horizontal shaft 158 and which gear meshes with a gear 159 secured to the pivot shaft 160 of crank arm 145, all supported on bracket or frame extension 1'.

Figure 16:
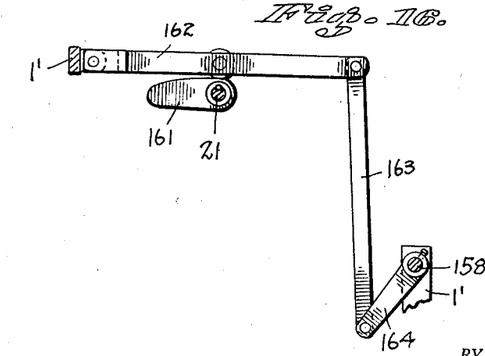
Fig. 16 is a detached view of the cam connections for swinging the pitting knives back to starting position after each pitting operation.

The two knives are thus swung through the cutting stroke independently by their springs but cannot swing until permitted to do so by a cam 161 on the forward cam shaft 21 (see Fig. 16) operating against a lever 162 connected by a link 163 to a crank 164 on shaft 158 provided at opposite ends with jaw clutches as at 165 engaging complementary jaws formed on loose gears 157. The arrangement being such that as shaft 158 is rocked by cam 161 in direction of arrow (Fig. 12) the clutches will revolve loose gears 157 and thereby return knives about a half turn to starting position for the next cut under influence of springs 155 which operate the knife shafts the moment the cam surface falls away and jaw clutches 165 are revolved in reverse direction so as to permit the springs to revolve gears 157.

The arched pitting blades are pivoted at 139 to a rocker arm 166 within the carriage 138 and the rocker arm is continually oscillated at high speed by a Bowden cable wire 167 extending along the knife shaft through a sheath 168, the upper end of the wire being connected at 169 to the outer end of the rocker arm and the lower end to the outer end of a rocking bar 170 pivoted centrally at 171 to the frame and rocked by means of a pitman 172 connected to a small crank 173 on continually running knife drive shaft 7. The connection of the wire at 174 to the rocking bar being a swivel in line with the vertical shaft center so as to permit free revolving or rocking of the knife shaft the necessary half turn without twisting effect on the oscillating wire.

Since the knives operate independently during their cutting strokes and it is imperative that the machine or rather the turrets remain at rest until both knives have come out of the fruit, independent automatic locking devices are provided on each vertical knife shaft to prevent turning of the clutch actuating shaft 175 which extends horizontally below the ends of the vertical knife operating shafts 141.

This shaft does not directly throw the main clutch 17 in or out of engagement, as the clutch is of a type arranged with trip to throw it out automatically upon the completion of each cycle of the machine, i. e. when the turrets have expanded and the peach receiving devices 25, 26 have returned to receiving position (as shown in Fig. 3), and the clutch cannot engage for the next cycle unless a release latch not shown is moved so that the clutch will automatically engage for a repetition of the cycle. The function of shaft 175 is upon being turned to move a rod 22 (Fig. 17) connected to a crank 177 at the end of the shaft, in direction of the arrow and thereby rock a lever 178 provided with an extension 179 shown broken in the figure, but which unlocks the clutch release mechanism not shown so that the clutch can re-engage after completion of the cycle.

Therefore if shaft 175 is locked against turning, it follows that the main clutch 17 will not re-engage but the machine will stop upon completing a cycle. To thus lock the shaft 175 until both knives have finished cutting out the pits I secure a jaw clutch-like device 180 to the lower end of each knife shaft so arranged that its jaw 181 will lie adjacent a jaw 182 of a sleeve 183 secured to shaft 175 and free to turn to clear the far side of jaw 182 when in position shown in Fig. 12 in which the knife is at the end of its cutting stroke. But at any other point of the cutting stroke the revolving of pivot shaft 160 carrying jaw 181 would turn it against the far side of and into the path of jaw 182 and thereby lock shaft 175 against movement. The construction is duplicated for both knife shafts so that the shaft 175 cannot be turned to set the clutch for re-engagement until both knives have finished their cuts.

Since the saw is not positively moved through the peach in cutting but carried forward only by pull of spring 51 when permitted to move by falling away of cam 48 it follows that the main clutch 17 must be prevented from re-engaging until the sawing of the peach is completed, else it would be torn apart by revolving of the turrets, and to this end I provide a trip lug 184 on saw pull back rod 50 so that when the saw is at the end of its forward or cutting movement the lug will move a crank 185 to thereby turn a shaft 186 and raise a latch rod 187 to unlock the upper end 178' of rock lever 178 so that this rock lever is free to respond to the turning of shaft 175. Thus the clutch cannot re-engage unless the saw has finished its cut and released lever 178 and both knives have finished their cuts and released shaft 175.

At one end of shaft 175 is a small crank 188 (see Fig. 17) linked at 188' to an upright lever 189 pivoted to the frame 1' and with its upper end formed with a lug 190 engaged in a notch on a small lever 191 pivoted at 192 carrying at its outer end the finger operated button 23. A light spring 193 resiliently urges the outer end of lever 191 upward so that its rear end will engage the lug 190 and thereby stop the upper end of lever 189 from swinging forward from the influence of a tension spring 194 hooked to the lower part of the lever, all so that upon pressure on the button lever 189 will be released and if at that time both pitting knives and the saw have finished their operations and the shaft 175 is free to turn, spring 194 operating through link 188 will at once turn it and thereby set the main clutch for re-engagement, and if either knife or saw has not quite completed its cut or is stuck for any reason at all the shaft 175 will not be turned by the spring until the obstruction has been removed and the knives and saw have finished.

Thus if a knife should be seen to stop in the peach before severing the pit, it suffices for the operator to give a slight push against the rear of the knife carriage to help the arched blade over some unusual obstruction on the pit and whereupon the blade will at once complete its cut and the clutch will automatically engage for the next cycle of the machine.

Figure 17:
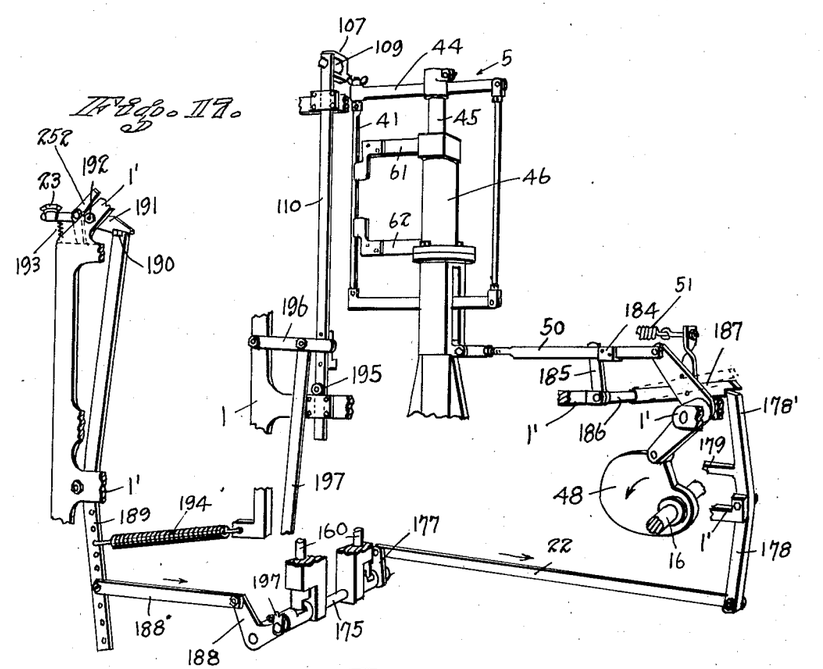
Fig. 17 is a dissected layout showing the clutch control system of the machine, the various members being somewhat distorted to better show their relation.

Lever 189 is returned to locking engagement with finger lever 191 upon collapsing movement of the turrets through means of the vertically slidable rod 110 at the right side of the frame and which carries a roller 195 near its lower end which upon upward movement of the rod upon collapse of the turrets contacts a lever 196 pivotally connected by a link 197 to a second arm on crank 188 so that just after the beginning of the new cycle lever 189 is returned to locked position shown in Fig. 17.

By the arrangement of automatic clutch control described it will be seen that an operator can insert a peach in the machine, pass his hand over clutch button 23 on the way to pick up the next peach or while picking up the next peach with the other hand, and the machine will have sawed the previous peach, returned the receiving devices and about finished pitting the second prior peach by the time the operator gets the next peach in position. Thus the button 23 will with an operator able to keep pace with the machine, always continue to re-cycle without throwing the clutch out and stopping the cam shafts at all.

As the pits are cut out they fall into chutes 198 for discharge from opposite sides of the machine, and after the pitted halves are carried to the third position D or outer sides of the turrets the fingers 114, 115 which clamp them in place are released as previously described (page 11), after which the freed halves are carried to the rear or fourth position E where they are ejected from the turret frames 88 as at E' by means of ejector plates 199 (Fig. 4) and the outer faces of the turret brushed off by brushes 200 carried on horizontally swinging arms 201 normally drawn inward by spring 202 and forced outward at the proper time by pivoted levers 203 actuated by the roller of crank 69 contacting a short leg 203' on one of levers 203, both levers being integrally joined by means of the pivot shaft 204.

The pitted halves upon ejection fall into discharge chutes 205, and the cleaned turret sides advance to align against one another in the center embracing the saw in the position shown in Fig. 4 for reception of a fresh peach.

As soon as a fresh peach is slid into place on the turret plates 39, 40 the clamping fingers 114, 115 are operated by means of a disk 206 which, through cam connections to the forward cam shaft not shown, is lifted against the beveled ends of latches 126 of the confronting sides of the turrets to thereby release the latches from catches 129, and whereupon the wedges 113 are thrown upward by springs 119 to clamp and lock the fingers against the outer sides of the peach in the manner previously described.

Certain details connected with the control of sliding carriages 36, 35 and 28 respectively of the bloom end device, stem end device and impaling guides 31, 32 will now be described. Carriages 28 and 35 are positively moved back and forth at the proper time by levers extending downwardly from the carriages and operated by suitable cams on the forward cam shaft 21. The upper end of levers of carriages 35 and 28 are shown in Fig. 1 respectively at 207, 208. The cams are not seen in the views but are of well known construction not involving invention.

The movement of carriage 36 while effected through a cam similar to the above is more involved and reference is therefore directed to Figs. 18 and 19 wherein the carriage 36 is slidable on round bar 38 and guided against tipping by means of downwardly extending lug 209 engaging the sides of a square bar 210 and is controlled through means of a main lever 211 to which an auxiliary lever 212 is pivoted at 213. The main lever is pivoted at its lower end (not shown) to the frame of the machine to swing from the position shown in full lines in Fig. 19 to the dotted position 211' under control of a cam 214 on the forward cam shaft 21 which moves the main lever one way to be returned upon falling away of the cam by a tension spring 215 connected to the lever at one end and suitably anchored to the machine frame at the other. The arrangement being such that upon movement of the main lever to the dotted position the auxiliary lever will contact a stop 216 and be forced to the dotted position 212. The upper end of lever 212 is connected by a tension spring 217 with carriage 36 so as lever 212 is swung to the right to put a tension on the spring and resiliently urge the arm 218 which caries the bloom end device 25 toward the stem end device 26, such movement however being intercepted by means of a latch rod 219 pivoted at 219' to the side of an extra guide bar 220 (provided for guiding the carriage of the stem end device) until tripped by the operator inserting a peach between the bloom and stem end devices and thereby pushing the bloom end device slightly to the left to drop latch 219 from contact with lug 209.

Latch 219 cannot drop in position shown in Fig. 19 as it is resiliently urged upward at the latching end by means of a small rocker 221 pivoted to lever 211 and pulled downward at its outer end by a light spring 222. The rocker is carried bodily to the right of latch pivot 219' upon swinging of lever 211 so as to be in position to gently urge the latch to release when bloom end device is in peach receiving position. A stop lug 223 is provided on the right-hand end of the latch bar to limit its unlatching movement.

In order to carry auxiliary lever 212 to the right with lever 211 the latter is provided with a side lug 224 which engages a jaw 225 on a hook 226 pivoted to the inner side of lever 212 and pulled down by spring 251. This hook 226 is provided with a side pin 227 engaging in a notch in lever 212 to limit its movement, and the hook is released from engagement with lug 224 when carried to the right and its angular face 226' rides over angular face 228 of a laterally projecting lug 229 carried on an auxiliary bar 230 extending horizontally from frame 1'. The release being effected just prior to the contact of lever 212 with stop 216 in order that lever 212 will thereby be reversed in its motion.

Bar 230 is shown broken away, but carries at its extreme left end a downwardly projecting plate 231 to form a stop against a T arm projection 232 of lever 212 to limit its movement to the left.

Arm 218 which carries at its outer end the bloom end device (and tip cutter 34) is vertically pivoted at 233 on carriage 36 so that the device can swing horizontally into and out of peach receiving position and its hub 234 is provided with small arms 235—236 which are intermittently contacted by various members during the operation of the machine to swing the bloom end device as required. One of the members is a rod 237 slidably mounted in a recess on the side of bar 210 and provided with laterally projecting pins 238, 239 alternately contacted by lever 211. In the position shown in Figs. 18 and 19 the rod is slid to the left forcing arm 235 to position shown with bloom end device swung into receiving position, but when slid to the right permits bloom end device to swing out of the path of the peach.

The bloom end device is, however, locked in receiving position by a small spring latch 240 mounted on carriage 36 and which engages a lug 241 on hub 234 even with rod 237 withdrawn, until movement of carriage 36 to the extreme left contacts latch 240 with adjustable stop screw 242 carried on an upwardly extending arm 243 secured to the end of guide rod 38 and extending below to be firmly secured to bar 210 and frame member 1'.

When the latch 240 is released and rod 237 withdrawn as takes place during the travel of the peach into the machine, the continued travel of the peach to the left simply swings the bloom end device laterally out of the way, though should no peach be in place the continued advancing to the left of the stem end device on its carriage 35 carries along a rod 244 which strikes arm 236 and swings the bloom end device out of the way and rides along the arm during the remainder of the travel so as to lock the bloom end device out of the path of travel.

Upon return of carriage of stem end device the reverse action takes place, arm 236 is released and arm 237 pushed to the left by the action of lever 211 to swing the bloom end device back in receiving position. In Figs. 18 and 19 the tip cutter shaft 245 (see Fig. 4) is omitted from its bearing bore 246 so as not to cause confusion in the drawing by obstructing details described.

After the peach is inserted the first movement of the machine starts all three carriages 28, 35 and 36 to the left simultaneously, carriages 28, 35 being moved as mentioned earlier in the specification by cam operated simple levers 208 and 207, but carriage 36 gets its motion to the left upon lever 212 striking pin 216 whereupon a pin 247 projecting on the far side at the upper end of lever 212 engaging the end of a slot 248 in a link 249 pivoted at its left end at 250 to the carriage. Carriage 36 is thus carried to the left a limited distance, and stopped at the point shown in Fig. 19 so that the bloom end device will be swung out of the path of travel of the fruit just before it reaches the saw.

A detail which should be mentioned is the provision of a lock on finger starting button 23. This lock comprises a small latch 252 pivoted to the side of lever 191 and which is swung upward to released position as shown in full lines in Figs. 1 and 17 or to dotted position shown in the latter figure to lock the machine against further operation.

The foregoing detailed explanation of all the important parts and their operation taken with the outline of main parts and outline of movements presented on pages 3 to 5 should give a clear idea of the machine as well as the points which distinguish it from the machines of my copending application as well as from prior patents of mine on similar apparatus, and since the machine herein described will pit various kinds of drupaceous fruits, or core apples, pears or other fruits with equal facility, it follows that my use of the word "peach" to designate the fruit operated on, and the word "pit" or "pitting", are not to limit the invention or claims in any way, but are to include in their meaning any fruit handled by the machine whether same be pitted or cored.

I claim:

1. In a machine for operating on fruit, a saw, edgewise aligned guide plates along which the fruit is slidable arranged in pairs in confronting relation with a crack intermediate the confronting faces of the plates in which said saw is positioned, and means for causing relative movement between the saw and the fruit on said guide plates whereby the fruit is bisected.

2. In a machine for operating on fruit, a saw, edgewise aligned guide plates along which the fruit is slidable arranged in pairs in confronting relation with a crack intermediate the confronting faces of the plates in which said saw is positioned, and means for causing relative movement between the saw and the fruit on said guide plates whereby the fruit is bisected, the outer faces of said plates extending past both sides of the saw.

3. In a machine for operating on fruit, a saw, edgewise aligned guide plates along which the fruit is slidable arranged in pairs in confronting relation with a crack intermediate the confronting faces of the plates in which said saw is positioned, and means for advancing the saw bodily between the faces of said plates for bisecting the fruit.

4. In a machine for operating on fruit, a saw, edgewise aligned guide plates along which the fruit is slidable aranged in pairs in confronting relation with a crack intermediate the confronting faces of the plates in which said saw is positioned, means for holding the fruit from opposite sides stationary on said guide plates, and means for bodily advancing the saw relative to the fruit between the faces of the plates for bisecting the fruit.

5. In a machine for operating on fruit, a blade for bisecting the fruit, edgewise aligned guide plates along which the fruit is slidable arranged in pairs in confronting relation with a relatively slight space intermediate their confronting faces and in which said blade is positioned with the faces of the plates extending past the blade, and means for causing relative movement of the fruit and blade whereby the fruit is bisected.

6. In a machine for operating on fruit, a jig saw for bisecting the fruit, means for reciprocating the jig saw, edgewise aligned guide plates along which the fruit is slidable arranged in pairs in confronting relation with a relatively slight space intermediate their confronting faces and in which the blade of said jig saw is positioned with the faces of the plates extending past the blade, and means for causing relative movement of the fruit and blade whereby the fruit is bisected.

7. In a machine for operating on fruit, a jig saw for bisecting the fruit, means for reciprocating the jig saw, edgewise aligned guide plates along which the fruit is slidable arranged in pairs in confronting relation with a relatively slight space intermediate their confronting faces and in which the blade of said jig saw is positioned with the faces of the plates extending past the blade, and means for swinging the jig saw in an arcuate path to cause relative movement of the fruit and blade whereby the fruit is bisected.

8. In a machine for operating on fruit, a pair of edgewise aligned fruit impaling plates with a space between their edges to straddle the core of the fruit, devices for holding a fruit at opposite ends centralized with respect to said plates, means for advancing the plates to impale the held fruit, means for moving the plates and said devices together with the fruit in the opposite direction, means for removing the leading one of said devices with respect to the direction of movement of the fruit from the path of the fruit, and a plurality of edgewise and laterally spaced plates aligned with said impaling plates upon which said fruit is slid.

9. In a machine for operating on fruit, a pair of edgewise aligned fruit impaling plates with a space between their edges to straddle the core of the fruit, devices for holding a fruit at opposite ends centralized with respect to said plates, means for advancing the plates to impale the held fruit, means for moving the plates and said devices together with the fruit in the opposite direction, means for removing the leading one of said devices with respect to the direction of movement of the fruit from the path of the fruit, a plurality of edgewise and laterally spaced plates aligned with said impaling plates upon which said fruit is slid, a fruit bisecting blade positioned between the laterally spaced plates, and means for causing relative movement of said blade and fruit for bisecting the fruit while on the laterally spaced plates.

10. In a structure as specified in claim 9, a pair of movable carriers each supporting respectively the laterally spaced plates positioned at opposite sides of the bisecting blade.

11. In a structure as specified in claim 9, a pair of movable carriers each supporting respectively the laterally spaced plates positioned at opposite sides of the bisecting blade and means for moving the carriers to carry the bisected fruit halves away from the blade.

12. In a structure as specified in claim 9, a pair of rotatable carriers each supporting respectively the laterally spaced plates positioned at opposite sides of the bisecting blade and means for rotating the carriers to carry the bisected fruit halves away from the blade.

13. In a structure as specified in claim 9, a pair of rotatable carriers each supporting respectively the laterally spaced plates positioned at opposite sides of the bisecting blade, means for rotating the carriers to carry the bisected fruit halves away from the blade, and means for clamping the bisected halves in place on the plates of the carriers.

14. In a machine for operating on fruit, a plurality of edgewise aligned double plates with a space between the double plates to accommodate a saw blade, means for holding a fruit in impaled position on said plates, and a fruit bisecting saw blade arranged to operate in the space between the double plates.

15. In a machine for operating on fruit, a plurality of edgewise aligned double plates with a space between the double plates to accommodate a saw blade, means for holding a fruit in impaled position on said plates, and a fruit bisecting saw blade arranged to operate in the space between the double plates, a frame on which said saw blade is mounted provided with means for arcuate swinging in the plane of the plates whereby the saw may be swung through the fruit impaled on the plates.

16. In a machine for operating on fruit, a plurality of edgewise aligned double plates with a space between the double plates to accommodate a saw blade, means for holding a fruit in impaled position on said plates, and a fruit bisecting saw blade arranged to operate in the space between the double plates, said saw being a reciprocable jig saw, and means for reciprocating the saw and advancing it through the fruit impaled on said plates.

17. In a machine for operating on fruit, a plurality of edgewise aligned double plates with a space between the double plates to accommodate a saw blade, means for holding a fruit in impaled position on said plates, and a fruit bisecting saw blade arranged to operate in the space between the double plates, and relatively thin spacers at opposite sides of said saw blade guiding and guarding the saw blade from direct contact with the inner surfaces of the double plates.

18. In a machine for operating on fruit, confronting flat plates upon the edges of which the fruit is impaled for bisecting, said plates being laterally separated by a relatively small space, a saw blade operatively positioned in the space between the plates, a frame supporting the saw, and relatively thin guides carried by said frame lying to either side of the saw blade to keep it out of direct contact with the inner confronting surfaces of said plates.

19. In a machine for operating on fruit, a pair of revolvable turrets, fruit supporting flat plates carried on the sides of each turret, means supporting the turrets adjacent one another for revolution and relative movement in such a manner that the plates of both turrets may be brought into confronting parallel relation at a point of revolution of the turrets, means for impaling a fruit on the edges of the plates while in confronting relation, a cutter operating between the plates for bisecting the fruit impaled thereon, and means for revolving the turrets to carry the bisected fruit halves away from the cutter.

20. In a machine for operating on fruit, a pair of revolvable turrets, fruit supporting flat plates carried on the sides of each turret, means supporting the turrets adjacent one another for revolution and relative movement in such a manner that the plates of both turrets may be brought into confronting parallel relation at a point of revolution of the turrets, means for impaling a fruit on the edges of the plates while in confronting relation, a cutter operating between the plates for bisecting the fruit impaled thereon, means for revolving the turrets to carry the bisected fruit halves away from the cutter to a second position, and coring knives at said second position arranged to cut out the cores or pits from the half fruit on said turrets.

21. In a machine for operating on fruit, a pair of revolvable turrets, fruit supporting flat plates carried on the sides of each turret, means supporting the turrets adjacent one another for revolution and relative movement in such a manner that the plates of both turrets may be brought into confronting parallel relation at a point of revolution of the turrets, means for impaling a fruit on the edges of the plates while in confronting relation, a cutter operating between the plates for bisecting the fruit impaled thereon, means for revolving the turrets to carry the bisected fruit halves away from the cutter to a second position, coring knives at said second position arranged to cut out the cores or pits from the half fruit on said turrets, means for revolving the turrets to a further position, and means for ejecting the fruit halves from said turrets.

22. In a machine for operating on fruit, a pair of revolvable turrets, fruit supporting flat plates carried on the sides of each turret, means supporting the turrets adjacent one another for revolution and relative movement in such a manner that the plates of both turrets may be brought into confronting parallel relation at a point of revolution of the turrets, means for impaling a fruit on the edges of the plates while in confronting relation, a cutter operating between the plates for bisecting the fruit impaled thereon, means for revolving the turrets to carry the bisected fruit halves away from the cutter to a second position, coring knives at said second position arranged to cut out the cores or pits from the half fruit on said turrets, means for revolving the turrets to a further position, and means for cleaning the outer faces of said turrets preparatory to their next confronting position.

23. In a machine for operating on fruit, a pair of revolvable turrets, fruit supporting flat plates carried on the sides of each turret, means supporting the turrets adjacent one another for revolution and relative movement in such a manner that the plates of both turrets may be brought into confronting parallel relation at a point of revolution of the turrets, means for impaling a fruit on the edges of the plates while in confronting relation, a cutter operating between the plates for bisecting the fruit impaled thereon, means for revolving the turrets to carry the bisected fruit halves away from the cutter to a second position, coring knives at said second position arranged to cut out the cores or pits from the half fruit on said turrets, means for revolving the turrets to a further position, and means for cleaning the outer faces of said turrets preparatory to their next confronting position comprising brushes carried on arms in a manner whereby they can sweep across the turret faces, and means for operating the arms.

24. In a machine for operating on fruit, a revolvable lantern-like turret provided with a plurality of fruit receiving faces on its outer sides, means for revolving the turret, clamps carried by the turret arranged for clamping the fruit against the inner sides of said fruit receiving faces, and means for operating said clamps to alternately clamp and release fruit at different points of revolution of said turret.

25. In a machine for operating on fruit, a revolvable lantern-like turret provided with a plurality of fruit receiving faces on its outer sides, means for revolving the turret, clamps carried by the turret arranged for clamping the fruit against the inner sides of said fruit receiving faces, means for operating said clamps to alternately clamp and release fruit at different points of revolution of said turret, and means for positively locking said clamps in engaged position with the fruit.

26. In a machine for operating on fruit, a fruit receiving plate, a clamp mounted for movement to clamp the fruit against said plate, means for forcing the clamp against the fruit and for definitely locking it against release movement at whatever point it may grip the fruit.

27. In a machine for operating on fruit, a fruit receiving plate, a clamp mounted for movement to clamp the fruit against said plate, means for forcing the clamp against the fruit and for definitely locking it against release movement at whatever point it may grip the fruit, the means for locking the clamp including a member resiliently forcing the clamp against the fruit and provided with a wedge-like face of an angle to prevent reverse movement of the clamp.

28. A structure as specified in claim 26 wherein a plurality of the clamps is provided each independently operable against the fruit as described.

29. A structure as specified in claim 27 wherein a plurality of the clamps is provided each independently operable against the fruit as described.

30. In a machine for operating on fruit, a revolvable lantern-like turret provided on its outer sides with a plurality of fruit-receiving faces, means mounting the turret faces for inward and outward movement with respect to the axis of the turret, means for clamping fruit against the faces, means for intermittently revolving the turret, and means for moving the faces inward on the turret operative at a point in the revolution thereof.

31. In a machine for operating on fruit, a revolvable turret provided with a plurality of fruit-receiving faces, means for clamping fruit against the faces, means for intermittently revolving the turret, said faces comprising plates, arms carrying said plates pivoted to the turret in a manner for movement of the plates inward and outward with respect to the center of the turret, devices connected to the arms adapted for moving them on their pivotal mountings, and means for so operating the arms at predetermined points of revolution of the turret.

32. In a machine for operating on fruit, a pair of edgewise aligned and spaced plates, means for clamping a half peach against one side of the plates with its pit exposed in the space, a curved knife at the other side of the plates arranged to swing through an arc intercepting the plane of the plates into the fruit for cutting out its pit, and a device at said other side of said plates arranged to support the flesh of the peach at a point between said plates adjacent the leaving point of the knife.

33. In a machine for operating on fruit, a pair of edgewise aligned and spaced plates, means for clamping a half peach against one side of the plates with its pit exposed in the space, a curved knife at the other side of the plates arranged to swing through an arc intercepting the plane of the plates into the fruit for cutting out its pit, and a device at said other side of said plates arranged to support the flesh of the peach adjacent the leaving point of the knife, said device comprising a small plate supported independently of said spaced plates.

34. In a machine for operating on fruit, a knife provided with an arched blade adapted to be swung through the fruit for pitting or coring the same, said blade formed with a cutting portion of its edge at the outer end of the arch projecting forward of the balance of the cutting edge of the blade in a direction transversely to the plane of the arch.

35. In a machine for operating on fruit, a knife provided with an arched blade adapted to be swung through the fruit for pitting or coring the same, said blade formed with a cutting portion of its edge at the apex of the arch extending at a point forward of the balance of the cutting edge of the blade in a direction transversely to the plane of the arch so as to provide a leading point of entry and emergence of the arch into and out of the fruit.

36. In a machine for operating on fruit, a support against which a fruit half is supported for pitting or coring, an arched blade mounted to swing in an arc through said fruit half for coring the same, a shaft upon which said blade is mounted provided with a freely movable joint at its end remote from said blade whereby the blade on its shaft may be moved in various directions with respect to the fruit so as to compensate for the shape of its pit or core, and means at the free end of the shaft resiliently constraining its freedom of movement during revolution.

37. In a machine for operating on fruit, a support against which a fruit half is supported for pitting or coring, an arched blade mounted to swing in an arc through said fruit half for coring the same, a shaft upon which said blade is mounted provided with a freely movable joint at its end remote from said blade whereby the blade on its shaft may be moved in various directions with respect to the fruit so as to compensate for the shape of its pit or core, and means at the free end of the shaft constraining it to follow a predetermined path upon being revolved.

38. In a machine for operating on fruit, a support against which a fruit half is supported for pitting or coring, an arched blade mounted to swing in an arc through said fruit half for coring the same, a shaft upon which said blade is mounted provided with a freely movable joint at its end remote from said blade whereby the blade on its shaft may be moved in various directions with respect to the fruit so as to compensate for the shape of its pit or core, and means at the free end of the shaft constraining it to follow a predetermined path upon being revolved comprising an adjustably mounted cam or guide member which may be set to vary the path traversed by the shaft upon revolution thereof.

39. In a machine for operating on fruit, a support against which a fruit half is supported for pitting or coring, an arched blade mounted to swing in an arc through said fruit half for coring the same, a shaft upon which said blade is mounted provided with a freely movable joint at its end remote from said blade whereby the blade on its shaft may be moved in various directions with respect to the fruit so as to compensate for the shape of its pit or core, and means at the free end of the shaft resiliently constraining its freedom of movement during revolution, and a fixed guiding arm arranged to positively limit the arc of travel during a portion thereof.

40. In a machine for operating on fruit, a plate against which a fruit half is supported for pitting or coring, an arched blade mounted to swing in an arc through said fruit half for coring the same, a shaft upon which said blade is mounted provided with a universal joint at its end remote from said blade whereby the blade on its shaft may be moved in various directions with respect to the fruit so as to compensate for the shape of its pit or core, means at the free end of the shaft resiliently constraining its freedom of movement during revolution and including a supporting bracket at the free end of the shaft in which the shaft is movable, and means for adjusting said bracket along a line substantially parallel with the fruit receiving plate.

41. In a machine for operating on fruit, a plate against which a fruit half is supported for pitting or coring, an arched blade mounted to swing in an arc through said fruit half for coring the same, a shaft upon which said blade is mounted provided with a universal joint at its end remote from said blade whereby the blade on its shaft may be moved in various directions with respect to the fruit so as to compensate for the shape of its pit or core, means at the free end of the shaft resiliently constraining its freedom of movement during revolution and including a bearing block at the free end of the shaft, a bracket in which said block is slidable, and a spring reacting between the block and bracket.

42. In a machine for operating on fruit, a plate against which a fruit half is supported for pitting or coring, an arched blade mounted to swing in an arc through said fruit half for coring the same, a shaft upon which said blade is mounted provided with a universal joint at its end remote from said blade whereby the blade on its shaft may be moved in various directions with respect to the fruit so as to compensate for the shape of its pit or core, means at the free end of the shaft resiliently constraining its freedom of movement during revolution and including a bearing block at the free end of the shaft, a bracket in which said block is slidable, and a spring reacting between the block and bracket, said bracket being supported for bodily adjustment with respect to the fruit.

43. In a machine for operating on fruit, a pitting or coring knife comprising a revolvably mounted shaft provided with an offset, a carriage block pivotally mounted at one end to the offset, an arched blade extending from the opposite end of the carriage, and spring means reacting between the carriage and shaft for resiliently holding the blade in an intermediate position.

44. In a machine for operating on fruit, a pitting or coring knife comprising a revolvably mounted shaft provided with an offset, a carriage block pivotally mounted at one end to the offset, an arched blade extending from the opposite end of the carriage, spring means reacting between the carriage and shaft for resiliently holding the blade in an intermediate position, a universal joint at the remote end of the shaft, and a slidably mounted bearing at the end of the shaft adjacent the carriage.

45. In a machine for operating on fruit, receiving devices for carrying the fruit away from receiving position into the machine, a bisecting device adapted to halve the fruit, means supporting the halves of the fruit mounted and adapted for swinging the halves to positions with the bisected surfaces substantially facing said receiving position, and curved knives mounted at said positions arranged for swinging through and pitting the fruit halves.

46. In a machine for operating on fruit, receiving devices for carrying the fruit away from receiving position into the machine, a bisecting device adapted to halve the fruit, means supporting the halves of the fruit mounted and adapted for swinging the halves to positions with the bisected surfaces substantially facing said receiving position, and curved knives mounted at said positions arranged for swinging through and pitting the fruit halves in plain view of the operative, said knives being yieldably mounted whereby they may be urged over an obstruction in the fruit by manual manipulation of the operative.

47. In a machine for operating on fruit, peach centering devices including a ring-shaped device adapted to receive the bloom end of a peach with its tip projecting into the ring, a revolvable shaft extending from a point adjacent to a point away from said device, a curved knife on said shaft positioned adjacent said device arranged to swing in an arc into the plane of the ring to cut off said tip, and automatic means for operating said shaft.

48. In a machine for operating on fruit, a slidable carriage, a pair of edgewise aligned and spaced plates mounted on said carriage, the carriage being in contact with one side of the plates and arched away therefrom so as to permit a fruit impaled on the plates to slide along the plates.

49. In a machine for operating on fruit, cooperating devices adapted for receiving a peach between them and support same from its bloom and stem end, a slidable carriage for each device and upon which it is mounted, means whereby the bloom end device may be swung on its carriage to inoperative position, a lever for positively moving the bloom end carriage in one direction and connected by a spring therewith for moving it in the opposite direction, a second lever arranged for swinging the bloom end device on its carriage, and a plurality of instrumentalities for moving and interlocking the levers substantially as described.

50. In a machine for operating on fruit, edgewise aligned plates spaced edgwise to straddle the core of the fruit and along which plates the fruit is adapted to be slidably impaled, laterally spaced plates forming aligned continuations of the outer faces of said edgewise aligned plates, and a fruit bisecting blade positioned in the space between said laterally spaced plates, the laterally spaced plates being close to opposite sides of said blade.

51. In a machine for operating on fruit, edgewise aligned plates spaced edgewise to straddle the core of the fruit and along which plates the fruit is adapted to be slidably impaled, laterally spaced plates forming aligned continuations of the outer faces of said edgewise aligned plates, and a fruit bisecting blade positioned in the space between said laterally spaced plates, said laterally spaced plates arranged to be separable along the line of the space therebetween whereby bisected fruit halves on the laterally spaced plates may be removed from said blade.

52. In a machine for operating on fruit, edgewise aligned plates spaced edgewise to straddle the core of the fruit and along which plates the fruit is adapted to be slidably impaled, laterally spaced plates forming aligned continuations of the outer faces of said edgewise aligned plates, a fruit bisecting blade positioned in the space between said laterally spaced plates, said laterally spaced plates arranged to be separable along the line of the space therebetween whereby bisected fruit halves on the laterally spaced plates may be removed from said blade, and means whereby said laterally spaced plates are turned away from the plane of their first position to respectively carry the bisected halves of the fruit with them.

53. In a machine for operating on fruit, a pair of turrets on spaced axes each provided with a plurality of fruit-receiving faces arranged around its axis, means revolvably mounting said turrets to bring successive faces of the turrets respectively into confronting relation as the turrets are revolved, means adapting the confronting faces of the turrets to be moved toward and from one another, and means for moving the confronting faces of the turrets close to one another when in such confronting relation to receive the fruit and also away from one another to permit revolving of the turrets to the next position.

54. In a machine for operating on fruit, a pair of turrets on spaced axes each provided with a plurality of fruit-receiving faces arranged around its axis, means revolvably mounting said turrets to bring successive faces of the turrets respectively into confronting relation as the turrets are revolved, means adapting the confronting faces of the turrets to be moved toward and from one another, means for moving the confronting faces of the turrets close to one another when in such confronting relation to receive the fruit and also away from one another to permit revolving of the turrets to the next position, and means revolving the turrets a fractional revolution only during the latter position of the turret faces.

55. In a machine for operating on fruit, a pair of turrets on spaced axes each provided with a plurality of fruit-receiving faces arranged around its axis, means revolvably mounting said turrets to bring successive faces of the turrets respectively into confronting relation as the turrets are revolved, means adapting the confronting faces of the turrets to be moved toward and from one another, means for moving the confronting faces of the turrets close to one another when in such confronting relation to receive the fruit and also away from one another to permit revolving of the turrets to the next position, and spacing means for providing a minimum clearance between the confronting faces when close together.

56. In a machine for operating on fruit, a saw, thin flat plates arranged close to and overlying opposite sides of the saw blade in planes parallel therewith and on which plates the fruit is impaled, and means for causing relative motion between the fruit and the saw for bisecting the fruit.

57. In a machine for operating on fruit, a saw, thin flat plates arranged close to and overlying opposite sides of the saw blade in planes parallel therewith and on the edges of which plates the fruit is impaled for guiding relatively past the saw for bisecting the fruit.

JOSEPH P. BEM.